US00RE36900E

United States Patent [19]

Taylor

[11] E Patent Number: Re. 36,900

[45] Reissued Date of Patent: Oct. 3, 2000

[54] CORDLESS ELECTRICAL APPLIANCES

[76] Inventor: John Crawshaw Taylor, Cronk My Chree Arbory Road, Castletown, Isle of Man 1M7 1HR British Isles, United Kingdom

[21] Appl. No.: 08/854,148

[22] Filed: May 9, 1997

Related U.S. Patent Documents

Reissue of:

[64] Patent No.: 5,413,510
Issued: May 9, 1995
Appl. No.: 08/030,003
Filed: Sep. 13, 1991

[30] Foreign Application Priority Data

Sep. 17, 1990 [GB] United Kingdom ..... 9020308
Sep. 13, 1991 [WO] WIPO ..... PCT/GB91/01569

[51] Int. Cl.[7] ..... H01R 13/03

[52] U.S. Cl. ..... 439/886; 439/887; 439/928

[58] Field of Search ..... 439/326–328, 439/372, 929, 885, 886, 876, 874, 924.1, 924.2

[56] References Cited

U.S. PATENT DOCUMENTS

| | | | |
|---|---|---|---|
| 1,966,263 | 7/1934 | Roller . | |
| 2,058,068 | 10/1936 | Duvall . | |
| 2,163,704 | 6/1939 | Ritz-Woller . | |
| 2,497,452 | 2/1950 | Hammell . | |
| 4,026,627 | 5/1977 | Benasutti | 439/886 |
| 4,189,204 | 2/1980 | Brown et al. | 439/886 |
| 4,767,337 | 8/1988 | Kawasaki et al. | 439/924.1 |
| 5,176,528 | 1/1993 | Fry et al. | 439/924.1 |
| 5,259,786 | 11/1993 | Huang | 439/929 |

FOREIGN PATENT DOCUMENTS

| | | |
|---|---|---|
| 3739319 | of 0000 | Germany . |
| 3826037 | of 0000 | Germany . |
| 2222732 | of 0000 | United Kingdom . |
| 463357 | 7/1935 | United Kingdom . |

OTHER PUBLICATIONS

Derwent's Abstract No. 900 18 E/42, SU 890 464, publ. week 8242 Mironenko V G.

Patent Abstract of Japan, vol. 2, No. 136, abstract of JP 53–102838, publ 1978 Jul. 9, Shin Nippon Seitetsu K.K.

*Primary Examiner*—Gary F. Paumen
*Attorney, Agent, or Firm*—Banner & Witcoff, Ltd.

[57] ABSTRACT

A cordless electrical appliance includes a male pin connector which engages vertically with a female socket connector mounted in a base for the appliance. The contacts are arranged such that one of the line or neutral connections makes last and breaks first. This connection includes a silver, copper backed contact mounted on a leaf spring with a corresponding male pin being made of copper and having a thin silver plating at least in a region of contact with the copper backed contact.

26 Claims, 2 Drawing Sheets

FIG. 1
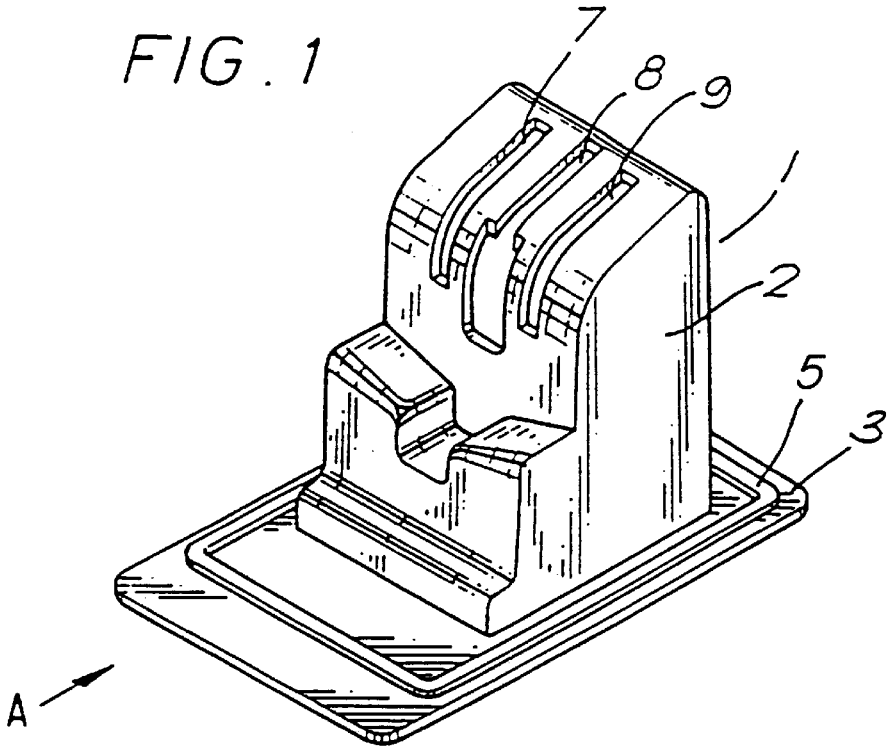
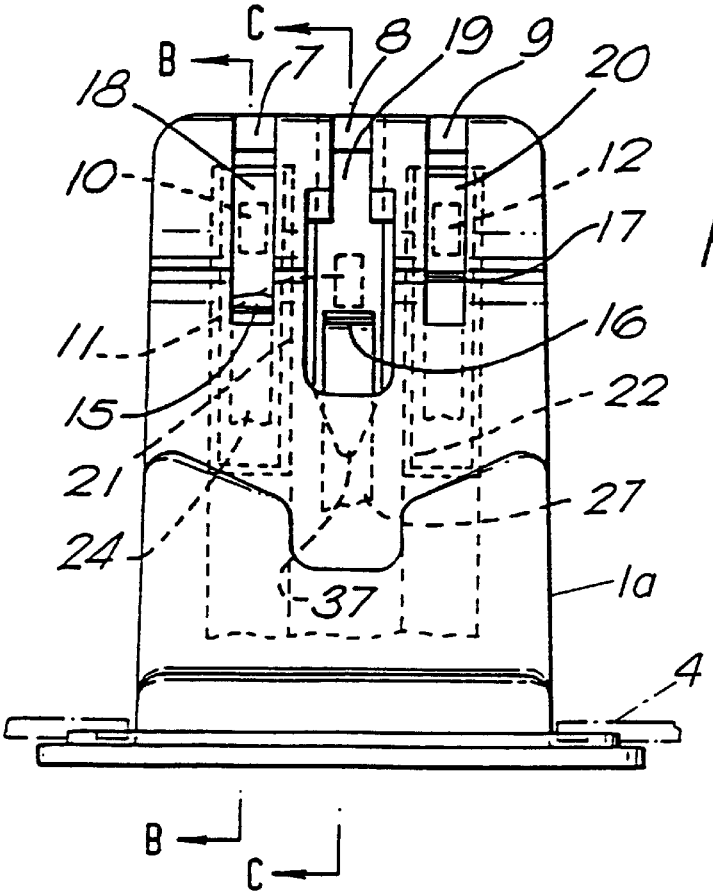
FIG. 2

CORDLESS ELECTRICAL APPLIANCES

Matter enclosed in heavy brackets [ ] appears in the original patent but forms no part of this reissue specification; matter printed in italics indicates the additions made by reissue.

This invention relates to cordless electrical appliances such as hot water jugs, kettles and electric irons. Such appliances are provided with a base or stand upon which the appliance can be placed for the supply of electrical power to the appliance. It is the base rather than the appliance which is connected to the mains power supply. The base includes a female socket connector which is connected to the power supply and is arranged to be engaged by a male pin connector on the appliance when it is placed on the base. Likewise the act of removing the appliance from the female socket connector disengages the male pin connector from the female socket connector. Such an appliance and base therefor will hereinafter be termed an electrical appliance and base of the kind referred to.

With such an arrangement if electrical connection is made and broken between the pins of the male pin connector and the contacts of the female socket connector whilst the latter are live i.e. connected to the mains supply, arcing will occur which may cause unacceptable heating and erosion at the points of electrical contact. To avoid this problem the appliance may be provided with an snap-acting switch as proposed in UK Patent Application GB-A2208332 which is operated by interengagement of appliance and base and serves, when open, electrically to isolate the appliance from the male pin connector. Desirably the said switch serves to isolate the male pin connector from the appliance whilst electrical contact is made and broken between the male pin connector and the female socket connector thus avoiding the possibility of arcing.

As an alternative to providing an isolating switch as aforesaid the undesirable effects of arcing may be contained by thickly silver plating the pins of the terminal pin connector and/or by providing the pins and the female socket connector with copper backed silver contacts. These solutions, as also the provision of an isolating switch, are costly and it is an object of the present invention to provide a simple and inexpensive solution to the problem of arcing between male pin and female socket connectors of cordless electrical appliances.

This invention is based on the discovery that the undesirable effects of arcing can be overcome by providing a female socket connector having a copper backed silver contact mounted on a leaf spring and as an associated male pin connector, a pin of copper as opposed to brass. Copper backed silver contacts are in common use. Typically the thickness of the silver in such contacts is from 0.1 mm to 0.3 mm with a copper backing of, for example, 0.7 mm. However the pins of male pin connectors are commonly made of brass. We have found that in use the mechanical wiping action of pin on silver contact which results as the pin is moved into and out of engagement with the leaf spring mounted contact and the making and breaking of the current results in a transfer of silver from the silver face of the leaf spring mounted contact onto the copper pin. The high thermal conductivity of the copper pin reduces the temperature at the contact/pin interface as does the heat sink effect of the copper backing of the contact. In the result wear at the contact interface is reduced. We have found that the silver transferred to the pin forms an atomically bonded surface layer, the thickness of which appears to reach an equilibrium during life testing.

Thus from a first aspect the invention provides an electrical appliance and base of the kind referred to wherein at least one electrical connection between the male pin and female socket connectors is formed by a leaf spring mounted copper backed silver contact, and a corresponding male pin being made at least in the contact forming region, of copper.

In one embodiment, both the line and neutral connections are formed as aforesaid.

Coppers which have proved suitable for male pins are industrially pure coppers according to BS2870 designated C101 and C108 (table 8) preferably with a hardness value of 70 to 95 HV. These coppers are examples of coppers substantially free from oxygen. The absence of oxygen from the copper appears to improve the contact life.

A composite pin in which the contact region is of copper could be employed but most conveniently the entire pin is punched out of copper.

Each male pin connector of the conventional three pin male connector and the corresponding female socket connectors may be formed in accordance with the present invention. However we have found that this is not necessary and that by offsetting male pin and/or female connections for the line and neutral supply connections relative to each other in the direction of their engagement and disengagement, so that the line or neutral electrical connection makes before and breaks after the neutral or line electrical connection, i.e. the line and neutral connections make and break sequentially, arcing can be limited to one electrical connection i.e. to one set of contacts. All that is required on breaking of the electrical connections is that the interval after the first electrical connection has broken be sufficient for any arc at the first connection to be extinguished before the next connection is broken.

With such an arrangement of sequential making and breaking of the line and neutral connections between male pin and female socket connector, simple leaf spring contacts i.e. not having a copper backed silver contact mounted thereon may be employed as one of the line or neutral and earth contacts of the female socket connector.

Thus in a preferred embodiment the line and neutral connections between male pin and female socket connectors are offset in the direction of engagement and disengagement for sequential making and breaking of the line and neutral connections, the connection last to make and first to break comprising a female socket connector having a copper backed silver contact mounted on a leaf spring, the associated male pin being made at least the contact making region, of copper.

Again only the one pin need be of copper although for convenience all three pins of the conventional three pin connector may be so constructed.

When as is usual an earth connection is provided it may be in accordance with the present invention.

It may be possible that, if the contact forming surface of the pin connector is of copper, prior to the establishment of an equilibrium layer of silver on the pin, oxidation of the surface may occur, resulting in the formation of the semiconductor copper oxide. This may inhibit the formation of the silver layer on the pin and cause overheating due to the presence of copper oxide in the electrical path. In a preferred embodiment, therefore, the pin, at least in its contact forming region is formed of copper and coated or plated with a thin coating of silver, preferably of a thickness from about 3 to 5 microns. This is found to prevent the formation of copper oxide and also facilitates the earlier development of the equilibrium layer of silver. This thickness of plating is thus substantially less, for example 20 to 100 times less, than the thickness of the silver in the corresponding composite contact which is typically 0.1 to 0.3 mm.

In those embodiments where a copper backed silver contact is provided on only one of the line or neutral side of the supply, the pin on the other side of the supply may also be thinly plated (for example also to 3 to 5 microns thickness) with silver in the event that arcing should inadvertently occur here due to misalignment of the contacts.

Corded electrical appliances such as hot water jugs or kettles usually incorporate a thermally-responsive control unit including terminal pins constituting a male pin connector, the pins extending horizontally and being located at the lower rear part of the appliance. Such a control unit serves to protect the electrical heater of the appliance if it is switched on or boils dry. Such controls are well known in the art and examples are shown in GB 2181598, for example. The pins of such control units are also conventionally of brass. In a cordless version of such an appliance, the pins of the control unit may engage directly with the contacts of a female socket connector provided in the base for the appliance. Generally this will necessitate the female socket connector being upstanding from the base. If this is not desired a three pin adaptor may be provided for the appliance which engages the pins of the control and provides three downwardly directed terminal pins for engagement with the female socket connector of the base which may then be recessed into the base. In either arrangement according to the present invention there is provided a thermally-responsive control unit as aforesaid or an adaptor therefor in which at least one terminal pin at least in the contact region thereof, is of copper and preferably in which the three pins are made of copper.

For securing sequential make and break of the electrical connections between male pin and female socket connectors, it is preferred to adjust the positions of the contacts of the female socket connector to obtain the desired result whilst retaining the standard relative dispositions of the male pins.

In a preferred embodiment of hot water jug and base, the jug has a thermally-responsive control unit as referred to above, the terminal pins thereof extending horizontally and being located at the lower rear part of the jug. The base has an upstanding female socket connector which is provided with slots in an upper and forwardly facing surface thereof whereby the horizontally extending pins of the control unit may be received vertically for engagement with spring contacts of the female socket connector.

As a safety feature the socket connector may be provided with shutter means for preventing access to the spring contacts therein when the appliance is removed from the base. This may conveniently take the form of a spring-loaded pivotally mounted shutter member which is deflected from its cover position by the appliance as the latter is engaged with the base. With a three pin connector as described above, the shutter may be provided with means for engaging one of the pins, for example the earth pin, as it enters the socket connector. The shutter member may also comprise a catch which engages with a part of the body of the socket connector and which is first disengaged from the socket connector body by a part of the appliance body to allow opening of the shutter by the further movement of the pin.

It will be appreciated that from a further aspect the invention provides an electrical connector comprising a male pin connector and a female socket connector, said socket connector having a spring mounted, copper backed silver contact, and said male pin connector, in its contact forming region at least, being of copper.

A preferred embodiment of the invention will now be described, by way of example only, with reference to the accompanying drawings, in which:

FIG. 1 is a perspective view of a female socket connector.

FIG. 2 is a view in the direction of arrow 'A' in FIG. 1 showing some hidden detail for clarity;

Figure 3:
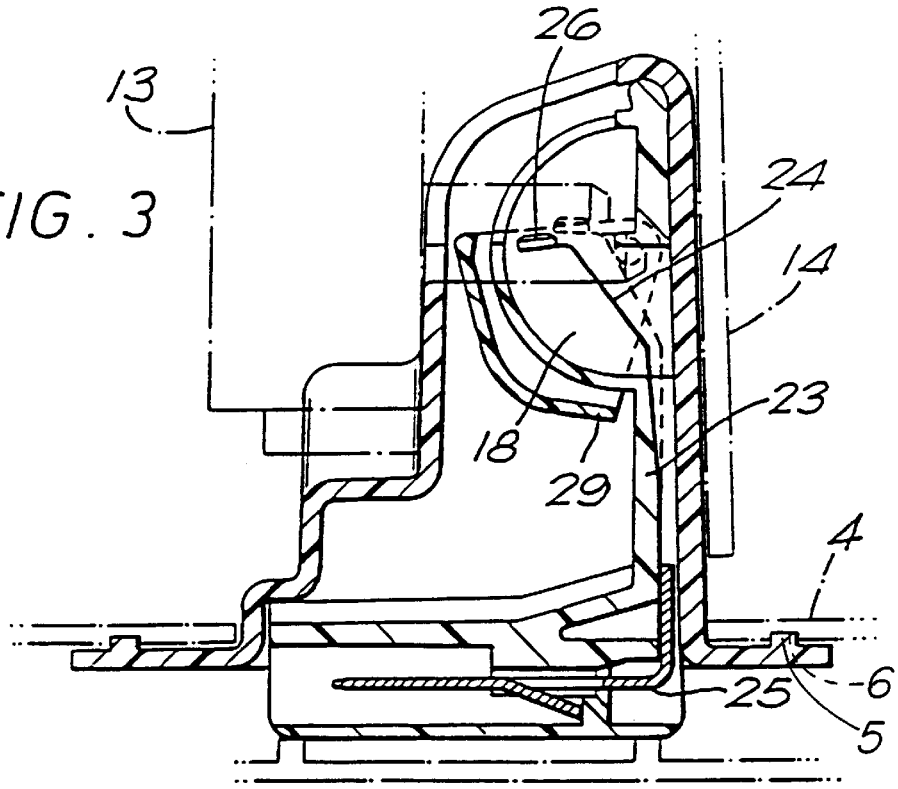
FIG. 3 is a sectional view-along the line B—B in FIG. 2 illustrating schematically the male pin connector of a hot water jug and a base therefor mounting the female socket connector.

Referring firstly to FIG. 1, a female socket connector 1 comprises a housing 2 which is moulded from a thermoplastics material and has a flange 3 around its base for engagement in a base unit 4 of a cordless hot water jug. A raised ridge 5 engages in a complementary recess 6 in the base 4. The socket connector housing 2 is formed with three slots 7, 8, 9 in an upwardly forwardly facing surface thereof which receive, respectively, the line 10, the earth 11 and the neutral 12 terminal pins of a thermally-sensitive control unit of a hot water jug 13. The general construction of such control units is well known in the art, being shown for example in UK Patent GB 2181598. The terminal pins, project horizontally rearwardly from the lower portion of the jug, and are concealed inside a shroud 14 which engages over the socket connector 1 when the jug is positioned on the base 4. The pins are stamped from copper and have a thin plating of silver to a thickness of between 3 and 5 microns.

Within the socket connector are arranged spring contacts 15, 16, 17 for engagement respectively with the line, earth and neutral terminal pins of the thermally-sensitive control. The contacts are housed within individual lateral compartments 18, 19, 20 which are separated by vertically extending walls 21, 22 provided in an inner socket member 23 mounted within housing 2. The line contact 15 (FIG. 3) comprises a beryllium copper leaf spring 24 which is mounted on the inner socket member 23 at its lower end where it is connected to a spade connector 25 which may be coupled to an external power supply lead (not shown). The spring 24 is provided at its upper end with a composite contact 26 having a silver surface and copper backing. Typically the contact is 3 mm diameter, with a silver thickness of 0.1 to 0.3 mm and a copper backing of 0.7 mm thickness. Conveniently the contact may be in the form of a stud which is riveted on to the leaf spring 24. The contact is movable from a position (shown dotted in FIG. 3) when the jug is disengaged from the base to a position (in solid lines) when the jug is engaged with the base.

The earth contact 16 (FIG. 4) also comprises a leaf spring 27 of beryllium copper which is mounted on inner member 23 within the socket housing 2 at its lower end where it is connected to a spade connector 28. At its upper end, however, instead of being provided with a separate composite contact, as in the line contact, the leaf spring 27 is merely rolled over to form a contact face 28*a*.

The neutral contact 17 has a similar construction to the line contact 15 except that instead of being provided with a separate composite contact, the spring is merely turned over at its end, in a manner similar to the earth contact 16, to form the contact face.

A shutter member 29 is arranged within the socket connector 2 and mounted on the inner member 23 for pivotal movement about an axis 30, between a first position in which it covers the openings 7, 8, 9 and a second position (shown in FIG. 3) in which it exposes the contacts 15, 16, 17. The shutter member 29 is biased towards the first position by spring means (not shown), and is moved towards the second position by the earth terminal pin 11 as it enters the slot 8. To this end the shutter 29 is provided with an open slot 31 in its mid upper region, which is bounded at its lower end by a bulbous wall portion 32 which, as shown in FIG. 4, engages with the earth terminal pin 11 as the latter enters slot 8.

Catch means are provided to prevent opening of the shutter member 29 merely by pushing down on the portion 32, when the jug is not on the base. The catch means comprises a pair of symmetrically arranged lugs 34 mounted on arms 35 extending through two parallel openings (not shown) in the back surface of the socket connector housing 1*a*. The lugs 34 are biased toward each other by the arms to engage on either side of the section of the socket housing wall 39 between the parallel openings. In order to release the catch, the shroud 14 of the jug is formed with a vertically extending rib 36 having a smoothly tapering lower section which as the jug is placed on the base 4 forces the lugs apart to align them with the openings in the rear wall, so that they may pass through the openings when the shutter 29 is pivoted around its axis 30 by the earth terminal pin 11. The rib 36 of the shroud is received in a complementary recess 37 formed in the rear of the socket housing 2.

As can be seen from FIG. 2, the contacts 15, 16, 17 are arranged at different relative vertical positions. The neutral contact 17 is uppermost, the earth contact 16 lowermost with the line contact 15 positioned between the two. In the jug, the neutral and line terminal pins 10, 12 are at the same vertical position but are positioned above the earth pin 11. The relative vertical positions of the pins, the contacts and the rib 36 of the jug shroud 14 are such that as the jug is engaged with the base, the following events occur in sequence: the rib 36 releases the shutter catch 33; the earth pin 11 engages with and opens the shutter 29; the earth pin 11 engages with earth contact 16; the neutral pin 12 engages with neutral contact 17; and finally line pin 10 engages with line contact 15. Upon removal of the jug from the base the sequence is reversed so that the electrical supply to the jug is always made and broken at the line contacts and arcing is confined to those contacts. It is for this reason that the separate contact member 20 is provided on the line side leaf spring 16, while no contacts are provided on the other leaf springs.

Figure 4:
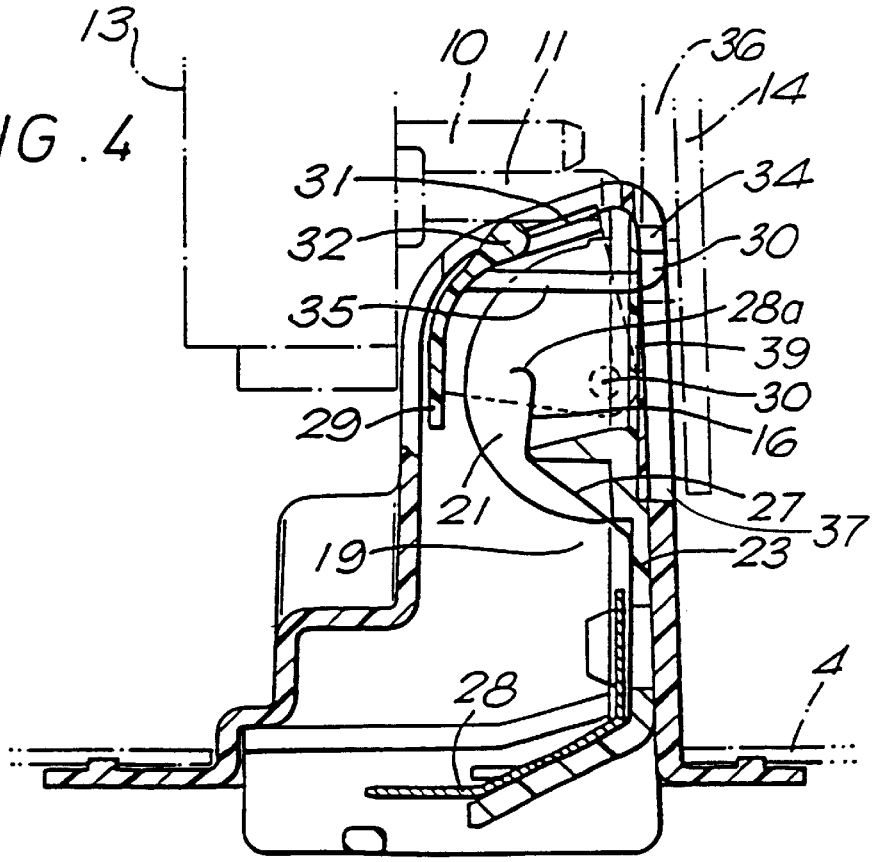
FIG. 4 is a sectional view along the line C—C in FIG. 2.

It will be seen from FIG. 3 that as a consequence of contact 26 being mounted on a leaf spring as the line contact 26 engages with the terminal pin 10 it is displaced not only downwardly, but also along the pin. This 'wiping' engagement acts to encourage the transfer of silver from the contact on to the copper pin.

It will be appreciated that the above description is merely for the purposes of illustration and is not limiting on the scope of the invention. Many possible modifications will be apparent to the person skilled in the art. For example separate contacts could be mounted on each of the leaf spring contacts, and the relative positions of the contacts and pin could be varied so that the electrical supply to the jug is always made and broken at the neutral contacts. Again whilst the preferred embodiment has been described with reference to a jug it could be equally applicable to a kettle.

Furthermore, not all of the pins need be made of copper—only that pin which contacts with the copper backed silver contact in one base need be so constructed, and the other pins may, for reasons of cost be made of brass, as is traditional. Thus in the illustrated embodiment only the line terminal pin 9 need be of copper, preferably with a thin silver plating.

Also, it is quite possible to dispense with the safety catch arrangement if this is found to be unnecessary.

I claim:

1. An electrical appliance and base comprising:

an electrical appliance including a male pin connector;

a base for the appliance, the base including a female socket connector which is arranged to be engaged by the male pin connector when the appliance is placed on the base; and at least one electrical connection between the male pin and female socket connectors being formed by a leaf spring mounted silver faced contact with a corresponding male pin, the male pin being made, at least in contact forming region thereof, of copper, the male pin wiping against the silver faced contact during engagement and disengagement of the female socket connector and the male pin connector so that silver from the silver faced contact is transferred to the pin.

2. An appliance and base as claimed in claim 1 wherein the copper is industrially pure copper.

3. An appliance and base as claimed in claim 1 wherein the copper has a hardness of from 70 to 95 HV.

4. An appliance and base as claimed in claim 1 wherein the male pin is punched out of copper.

5. A appliance and base as claimed in claim 1 having line and neutral connections, wherein both the line and neutral connections are formed by leaf spring mounted silver faced contacts, and corresponding male pins, the male pins being made, at least in contact forming regions thereof, of copper.

6. An appliance and base as claimed in claim 1 or 5 having line and neutral connections between male pin and female socket connectors wherein the line and neutral connections are offset in a direction of engagement and disengagement for sequential making and breaking of the line and neutral connections, and at least a connection last to make and first to break includes a silver faced contact mounted on a leaf spring, an associated male pin being made, at least in a contact making region thereof, of copper.

7. An appliance and base as claimed in claim 1 wherein the male pin is provided with a thin coating of silver extending over at least the contact forming region thereof.

8. An appliance and base as claimed in claim 7 wherein the thickness of the coating is from about 3 to about 5 microns.

9. An appliance and base as claimed in claim 1 wherein the appliance further includes a thermally-sensitive control unit having terminal pins extending, during normal use, horizontally from a lower rear part of the appliance.

10. An appliance and base as claimed in claim 9 wherein the female socket connector includes slots in an upper and forwardly facing surface thereof whereby the horizontally extending pins of the control unit are receivable vertically for engagement with spring contacts of the female socket connector.

11. An electrical connector comprising a male pin connector and a female socket connector, the socket connector including at least one spring mounted, silver faced contact, and the male pin connector including a corresponding terminal pin which is formed of copper at least in a region thereof adjacent a point of engagement in use with the socket connector contact, the male pin wiping against the socket connector contact during engagement and disengagement of the female socket connector and the male pin connector so that the silver from the socket connector contact is transferred to the pin.

12. A portable electrical water heating appliance and base comprising:

a water heating appliance including a thermally sensitive control unit having terminal pins; and a base for receiving the appliance, the base including a female socket connector for receiving the terminal pins, wherein at least one of the terminal pins is formed, in at least a contact forming region thereof, of industrially pure copper, the contact forming region further having a thin silver coating, the female socket connector having a spring mounted silver faced contact for engagement with the contact forming region of the terminal pin, the terminal pin wiping against the silver contact during engagement and disengagement of the female socket connector and the terminal pin so that silver from the contact is transferred to the terminal pin.

13. An appliance and base as claimed in claim 12 wherein, in use, the terminal pins extend horizontally at a lower rear part of the appliance, and the socket connector is configured to receive the pins vertically.

14. An appliance and base as claimed in claim 12 or 13 wherein the coating is between about 3 and 5 microns in thickness.

15. A connector as claimed in claim 11 wherein the terminal pin has a thin coating of silver over a contact forming region thereof.

16. A connector as claimed in claim 15 wherein the coating is between about 3 and 5 microns in thickness.

17. An electrical appliance and base comprising:

an appliance including a thermally sensitive control unit including terminal pins;

a base for receiving the appliance, the base including a female socket connector for receiving the terminal pins so that line and neutral connections are made therewith, wherein an arrangement of the pins and base contacts arranged within the base is offset in a direction of engagement and disengagement such that engagement of the respective pins with the respective base contacts is staggered, a connection making last and breaking first being made between a thinly silver coated copper terminal pin and a leaf spring mounted silver faced contact, the terminal pin wiping against the silver contact during engagement and disengagement of the female socket connector and the terminal pin so that silver from the contact is transferred to the terminal pin.

18. An electrical appliance and base comprising:

an electrical appliance including a male pin connector;

a base for the appliance, the base including a female socket connector which is arranged to be engaged by the male pin connector when the appliance is placed on the base; and at least one electrical connection between the male pin and female socket connectors being formed by a leaf spring mounted copper backed silver contact with a corresponding male pin, the male pin being made, at least in a contact forming region thereof, of copper, the male pin wiping against the silver contact during engagement and disengagement of the female socket connector and the male pin connector so that silver from the contact is transferred to the pin.

*19. An electrical appliance including a housing having a male pin connector and also including a base having a female socket connector which is arranged to be engaged by said male pin connector when the appliance housing is vertically inserted downwardly on the base, the male pin connector comprising line, neutral and earth pins extending generally horizontally at the lower rear part of the appliance housing, and the female socket connector including female contacts comprising a plurality of leaf springs, each extending upwardly through the female socket connector and having an upwardly facing contact surface provided on its upper end for engagement with a corresponding male pin, and vertically offset from one another for sequential engagement and disengagement with the male pins.*

*20. An electrical appliance housing an base as claimed in claim 19 wherein the female contact which is last to engage with a male pin is first to disengage with said male pin and comprises a spring mounted member.*

*21. An electrical appliance housing and base as claimed in claim 20 wherein the female contact which is last to engage with a male pin is first to disengage with said male pin and comprises a contact member mounted on a leaf spring, and further comprising another female contact including a leaf spring without a contact member mounted thereon.*

*22. An electrical appliance housing and base as claimed in claim 19, 20 or 21 wherein the male pin connector part of the connection last to make and first to break comprises a silver coated pin.*

*23. An electrical appliance housing and base as claimed in claim 19 further comprising a male earth pin which engages with an earth contact in the female socket connector prior to engagement by the male line pin and the male neutral pin with the corresponding line or neutral contacts in the female socket connector when the appliance housing is placed on the base.*

*24. An electrical appliance housing and base of claim 19 further comprising a centering recess and centering ridge on respective appliance housing and base to align the pins and springs.*

*25. An electrical appliance housing and base of claim 19 further comprising walls separating the female contacts.*

*26. An electrical appliance housing and base of claim 19 further comprising separate compartments for the female contacts.*

* * * * *